United States Patent
Pedreiro et al.

(10) Patent No.: US 7,548,305 B1
(45) Date of Patent: Jun. 16, 2009

(54) SHALLOW ANGLE SHAPE SENSOR

(75) Inventors: Nelson Pedreiro, Menlo Park, CA (US); Roelof W. H. van Bezooijen, El Granata, CA (US); Larry Dewell, Los Gatos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 203 days.

(21) Appl. No.: 11/181,848

(22) Filed: Jul. 15, 2005

Related U.S. Application Data

(60) Provisional application No. 60/613,714, filed on Sep. 29, 2004.

(51) Int. Cl.
  *G01C 11/12* (2006.01)
  *G01B 11/24* (2006.01)
(52) U.S. Cl. .......................... 356/2; 356/601
(58) Field of Classification Search ................. 356/601, 356/610, 309
  See application file for complete search history.

(56) References Cited

U.S. PATENT DOCUMENTS

| | | | | |
|---|---|---|---|---|
| 3,992,106 A | * | 11/1976 | Auerbach | ............ 356/139.02 |
| 5,911,126 A | * | 6/1999 | Massen | .................. 702/153 |
| 6,097,493 A | * | 8/2000 | Satake et al. | ............ 356/609 |
| 2002/0172964 A1 | * | 11/2002 | Ippolito et al. | ............. 435/6 |
| 2003/0202686 A1 | * | 10/2003 | Rowe | ...................... 382/118 |
| 2004/0021098 A1 | * | 2/2004 | Gorinevsky et al. | .... 250/559.19 |
| 2004/0130729 A1 | * | 7/2004 | Van Coppenolle et al. | .. 356/601 |
| 2004/0252862 A1 | * | 12/2004 | Camus et al. | ............... 382/104 |

* cited by examiner

*Primary Examiner*—Tarifur Chowdhury
*Assistant Examiner*—Tara S Pajoohi
(74) *Attorney, Agent, or Firm*—McDermott Will & Emery LLP

(57) ABSTRACT

A system for providing shape determination of a planar or quasi-planar surface is disclosed. The system includes a number of targets located on the surface and one or more sensor devices. The sensor devices are configured to monitor the targets and obtain information relating to deflections normal to the plane of the surface. The sensor devices are mounted close to each other and the line-of-sight of each sensor device is at a shallow angle to the plane of the surface. The system further includes processing logic configured to execute a shape reconstruction algorithm based on the information to determine the shape of the surface.

53 Claims, 12 Drawing Sheets

SHALLOW ANGLE SHAPE SENSOR

CROSS-REFERENCES TO RELATED APPLICATION(S)

The present application claims the benefit of priority under 35 U.S.C. §119 from U.S. Provisional Patent Application Ser. No. 60/613,714 entitled "SHALLOW ANGLE SHAPE SENSOR", filed on Sep. 29, 2004, the disclosure of which is hereby incorporated by reference in its entirety for all purposes.

STATEMENT AS TO RIGHTS TO INVENTIONS MADE UNDER FEDERALLY SPONSORED RESEARCH OR DEVELOPMENT

N/A

BACKGROUND OF THE INVENTION

The present invention relates generally to shape determination and, more specifically, to methods and systems for determining the shape of surfaces and/or structures associated with large quasi-planar systems.

Several methods and systems have been proposed to determine the shape of surfaces and/or structures associated with large quasi-planar systems, such as, radar antennas. Such systems include, for example, range-based metrology systems that utilize either optics or radio frequency (RF) and scanning devices or multiple sources/targets, image-based systems (e.g. videogrammetry), and local sensors (e.g., strain-gages and/or accelerometers) that are combined with metrology and/or image-based systems. These systems have their respective limitations, as will be further described below.

Range-based metrology systems (e.g. optical, RF) use measurement of distance to estimate the shape of the surface. In such systems, the sensitivity of the measurements decreases as the deformation component normal to the direction of distance measurement increases. This illustrates some of the inherent limitations of range-based metrology systems, i.e., the need to have the source at a distance from the plane of the surface for which the shape is to be determined, and a potential low sensitivity of the measurement to the quantity of interest.

An alternative is to use various metrology sources distributed along the length of the surface to avoid the low sensitivity problem. However, this introduces additional complexity due to a number of factors including, for example, the need to determine the relative motion between the various sources so as to allow their measurements to be reconciled (non-collocated sources mounted along the structure will deflect/move with respect to each other), and the larger number of components in the system.

A range-based metrology system (e.g. laser metrology) can use either a scanning source, which revisits various target points on the surface of interest at regular intervals or various source/target pairs to avoid the need to scan. Scanning systems introduce performance limitations due to the additional complexity associated with such systems and the time it takes to generate a complete scan (i.e., time to cover entire surface). The use of various source/target pairs removes those limitations at the cost of increasing the number of components. In summary, high cost and overall complexity are severe limitations of existing range-based metrology systems.

Image-based systems have the advantage of covering a large area with high resolution without the need to scan. Such systems that have been proposed for shape determination of large quasi-planar systems, such as radar antenna, use videogrammetry technology and are based on stereo imaging. These systems reconstruct a three-dimensional image and/or displacement from two or more camera images taken from different locations and require depth of view when taking the images. More specifically, the cameras need to be mounted on a back (or front) structure at a distance from the surface to be measured. These systems suffer from similar inherent limitations as those discussed for range-based metrology systems, e.g., the low sensitivity for points at the far field and the need for mounting at a distance from the surface. In addition, for increased accuracy, camera lines-of-sight must be registered with respect to each other. This could be a complex proposition because the cameras need to be separated, i.e., mounted on different portions of the structure, and metrology is necessary to achieve the required registration. Calibration would be complex and time varying due to the relative motion between the cameras. Furthermore, even without the registration problem, computations are complex and slow resulting in low update rate and the resolution and accuracy are limited. Although in terms of complexity and cost, these systems compare favorably to range-based metrology systems, it is unlikely these systems can achieve the performance required for a large radar antenna.

Sensors that provide measurements of local deformation (such as strain-gauges) or motion (such as accelerometers) can be used to augment range-based or image-based technology. These sensors do not provide a direct measurement of surface shape. Their signals need to be integrated to generate the desired information and, therefore, they can only be used in conjunction with a system that provides direct shape information for removal of errors that accumulate over time due to drift and bias on the sensors. For extremely large structures (e.g. space-based radar), the accelerometers have limited value due to the low frequency of the structural modes of interest and of thermal induced deformations.

Hence, it would be desirable to provide a system that is able to provide shape determination for large quasi-planar systems in a more efficient manner.

SUMMARY OF THE INVENTION

In one aspect of the present invention, a system is provided to handle shape determination of future space-, air- or ground-based systems having large quasi-planar payloads or subsystems, such as, extremely large radar antennas. The system, referred to herein as the Shallow Angle Shape Sensor (SASS) system, is well suited for various applications including, for example, large space-based radar applications where the antenna dimensions are on the order of hundreds of meters.

The SASS is designed to take advantage of the unique geometry of large quasi-planar systems, such as, extremely large antennas. It exploits the fact that in such systems deformations or deflections of interest are predominantly in the direction normal to the surface and that the deformed shape is observable and can be reconstructed from information related to such deformations.

In one implementation, the SASS system includes a number of targets mounted to a planar or quasi-planar surface for which the shape is to be determined, a number of sensor devices (such as, video imaging cameras) mounted with their lines-of-sight at a shallow angle to the plane of the surface to capture information from the targets, and algorithms for control and processing logic configured to use one or more shape reconstruction or estimation algorithms to determine the shape of the surface using information provided by the targets and captured by the sensor devices. The one or more shape reconstruction algorithms to be used can be selected from a number of available shape reconstruction algorithms. Selection of the appropriate shape reconstruction algorithm(s) depends on each application and/or system design.

The targets are elements that can be recognized by the sensor devices. These targets can be passive, such as, patterns located on the surface or retro-reflectors, or active, such as, light-emitting-diodes (LEDs) or laser diodes (LDs). The light sources for active targets, such as LEDs or LDs, can be located remotely through the use of optical fibers.

The sensor devices are mounted to a common base such as, for example, a spacecraft bus in space applications, with their lines-of-sight at a shallow angle to the plane of the surface. One or more sensor devices may be used to cover the entire surface or to provide enough coverage to allow shape determination. The sensor devices are mounted close to each other so their relative motion can be neglected and their measurements easily reconciled to provide deflection information over the entire surface. This leads to simple calibration and higher stability of the imaging system.

The present invention provides a number of advantages and benefits and addresses various limitations inherent to other methods and approaches that have been proposed for shape determination of large space-, air- and ground-based systems. For example, in one implementation, the SASS system is mounted close to the surface of a structure for which the shape is to be determined and, hence, does not require the deep back/front structure needed by range-based metrology systems and stereo video systems. The SASS system also does not suffer from the sensitivity limitations of range-based metrology and stereo video systems for points far away from the sensors or metrology launchers. This is due to the unique SASS design. The sensors' lines-of-sight at a shallow angle to the surface provide measurements that are very sensitive to deflections normal to the plane of the surface over the entire surface area covered by the sensors.

This system provides measurements that are highly sensitive to deflections normal to the plane of the surface and less sensitive to deflections within the plane of the surface. This is exactly what is required to determine the shape of extremely large quasi-planar systems such as a radar antenna, large solar array or a large optical surface. The shape of the surface can be directly reconstructed from these measurements. In fact, the measurements are highly sensitive to deflections normal to the sensor line of sight, which makes the concept also well suited for high-aspect ratio three-dimensional surfaces that are not necessarily quasi-planar.

The SASS system is expected to be low cost, reliable and have high performance. Using existing Charged Coupled Device (CCD) camera technology, SASS systems can be designed for surfaces of hundreds of meters and achieve accuracy of 0.1-mm and bandwidth of several Hertz. With this performance, it should meet the requirements for critical applications such as extremely large space-based radar antennae.

Furthermore, the SASS system does not have the problem of motion registration between metrology launchers and the cameras required for stereo imaging systems. This is because the SASS sensors are mounted close to each other on a stiff/stable structure near the surface of interest. The stiff structure may include, for example, the spacecraft bus for space applications. Hence, the SASS system is expected to provide excellent performance, high reliability and be cost effective.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings, wherein.

DESCRIPTION OF THE SPECIFIC EMBODIMENTS

The present invention in the form of one or more exemplary embodiments will now be described. In one embodiment, the system (herein referred to as the "Shallow Angle Shape Sensor" (SASS) system) utilizes a machine vision system with cameras and targets located on the surface for which the shape is to be determined. With the understanding that deflections normal to the plane of the surface are dominant and sufficient to determine the shape of the surface, the system uses sensor devices, such as, video cameras, located near the plane of the surface and at a shallow angle with the surface to be measured to receive information from the targets.

Figure 1:
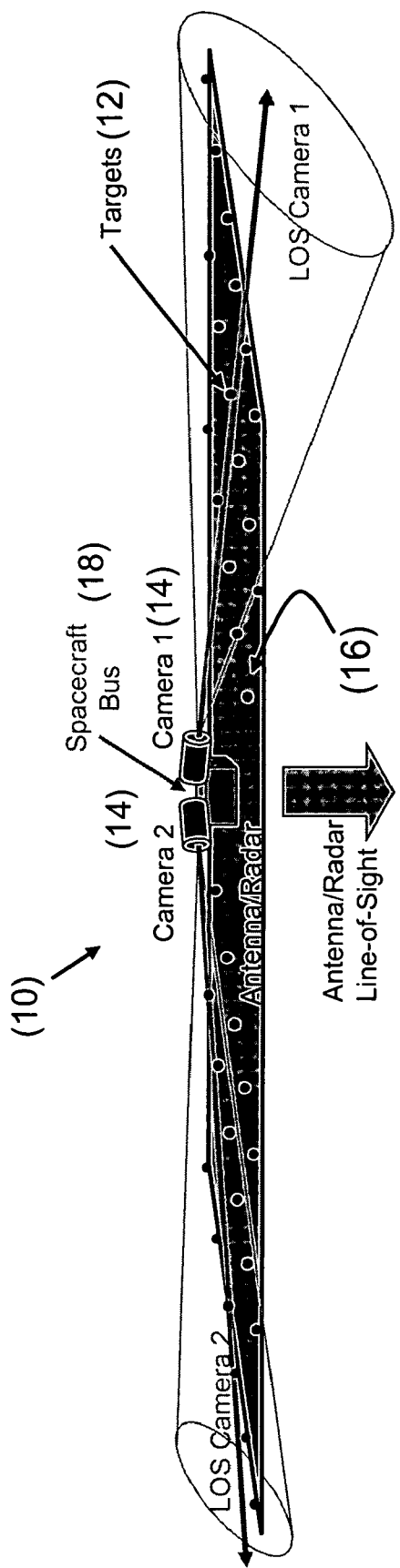
FIG. 1 is a simplified schematic diagram illustrating an embodiment of the present invention.

FIG. 1 illustrates a system 10 representing an embodiment of the present invention. As shown in FIG. 1, the system 10 includes a number of targets 12, two (2) video cameras 14 mounted on a spacecraft bus 18, and a large structure having a planar or quasi-planar surface 16, such as, a radar antenna. The targets 12 are mounted on the back side of the surface 16. It should be noted that the targets 12 and cameras 14 could also be mounted to the front side of the surface 16. The video cameras 14 are mounted to the spacecraft bus 18 with their lines-of-sight at a shallow or small angle to the plane of the surface 16. The angle between the cameras' lines-of-sight and the plane of the surface 16 may vary depending on the system design and/or constraints. In general, the angle can be positive or negative and, preferably, close to zero (0). Angle selection is dictated by the specific application and may depend on several parameters, such as, surface size, ability to mount the camera at a distance from the surface, and target obstruction, overlap and separation. Large angles are generally not preferred as the sensitivity of the measurements decreases with increasing angle. For example, having a ninety (90) degree angle would mean deflections that are normal to the surface would be parallel to the camera's line-of-sight, thus rendering it difficult for the deflections to be measured with the camera. Based on the disclosure and teachings provided herein, a person of ordinary skill in the art will appreciate how to determine the angle to be used between a camera's line-of-sight and the plane of the surface to be measured in accordance with the present invention.

In FIG. 1, two (2) cameras 14 are shown covering each half of the surface 16. Based on the disclosure and teaching provided herein, it should be understood that more or fewer cameras may be used to provide coverage for the entire surface 16. The cameras 14 are mounted close to each other so their relative motion can be neglected and their measurements easily reconciled to provide deflection information over the entire surface 16. As mentioned above, the cameras 14 are mounted on the spacecraft bus 18 (or common mounting structure) so their relative motion becomes insignificant.

The targets 12 are elements that can be recognized by the cameras 14. The targets 12 can be either passive or active elements or a combination of both. For example, a target 12 can be a passive element, such as, a pattern located on the surface 16, or a reflector used to reflect light emitted from a source located elsewhere in the system 10, for example, at a location close to the camera 14. In this case, the source could illuminate the reflectors continuously or intermittently and the camera 14 would detect the reflection and the position of the reflectors. Active elements can also be used as targets including, for example, light-emitting diodes (LEDs) or laser diodes (LDs).

Figure 2:
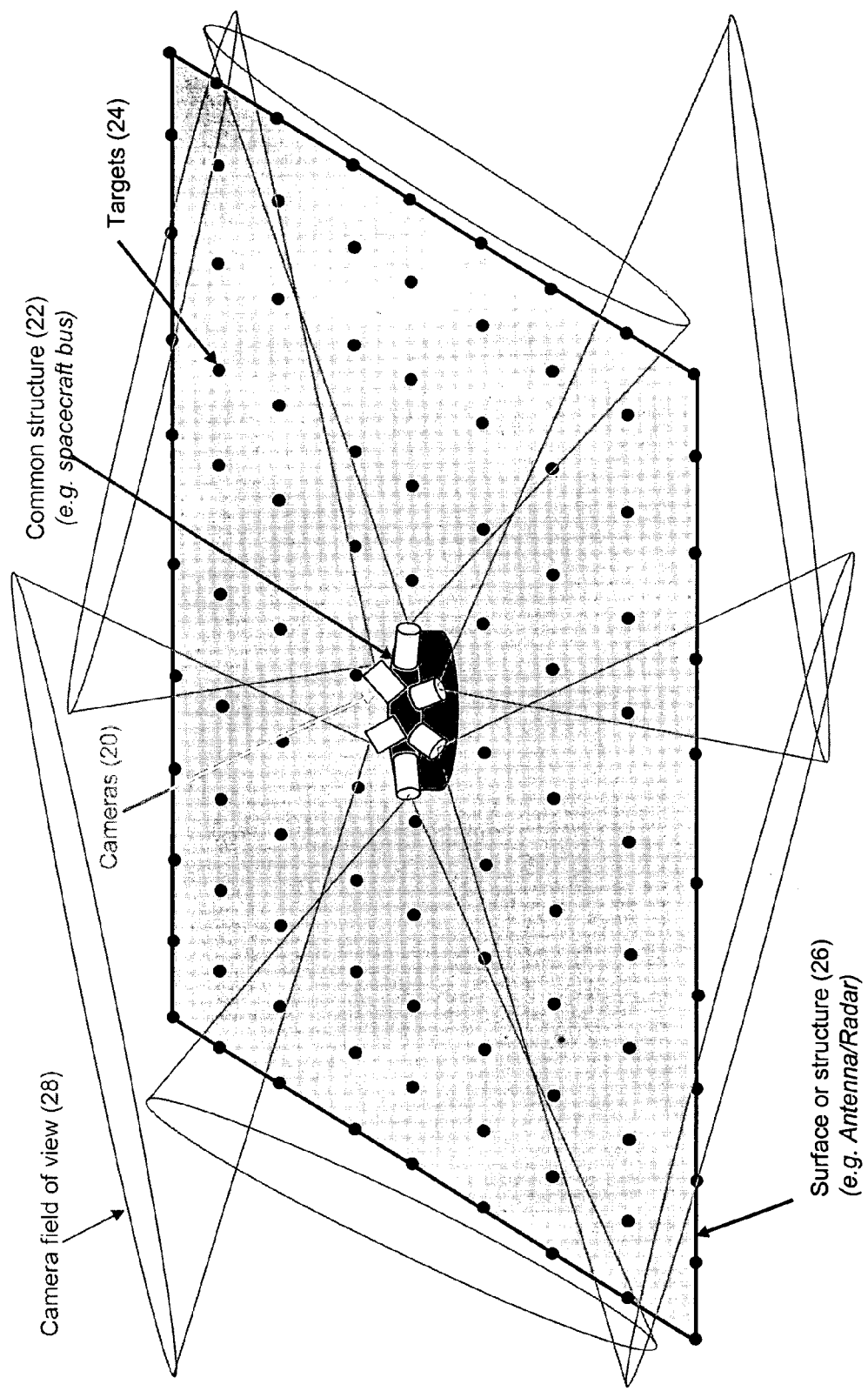
FIG. 2 is a simplified schematic diagram illustrating another embodiment of the present invention.

FIG. 2 illustrates an alternative embodiment of the present invention for a large surface with low aspect ratio. In this case, several cameras 20 are used to provide sufficient surface coverage. The cameras 20 are mounted to a common structure 22. The cameras 20 track a number of targets 24 distributed over the surface 26. The respective field of views 28 of the cameras 20 may overlap. i.e., some targets 24 are sensed by more than one camera 20. Such overlap relaxes the requirements for motion control/registration among the cameras 20 and provides additional information that can be used by the algorithms to conduct system calibration and increase the robustness of the shape estimation. For example, such additional information may be used to correct for relative motion between the cameras 20.

Figure 3:
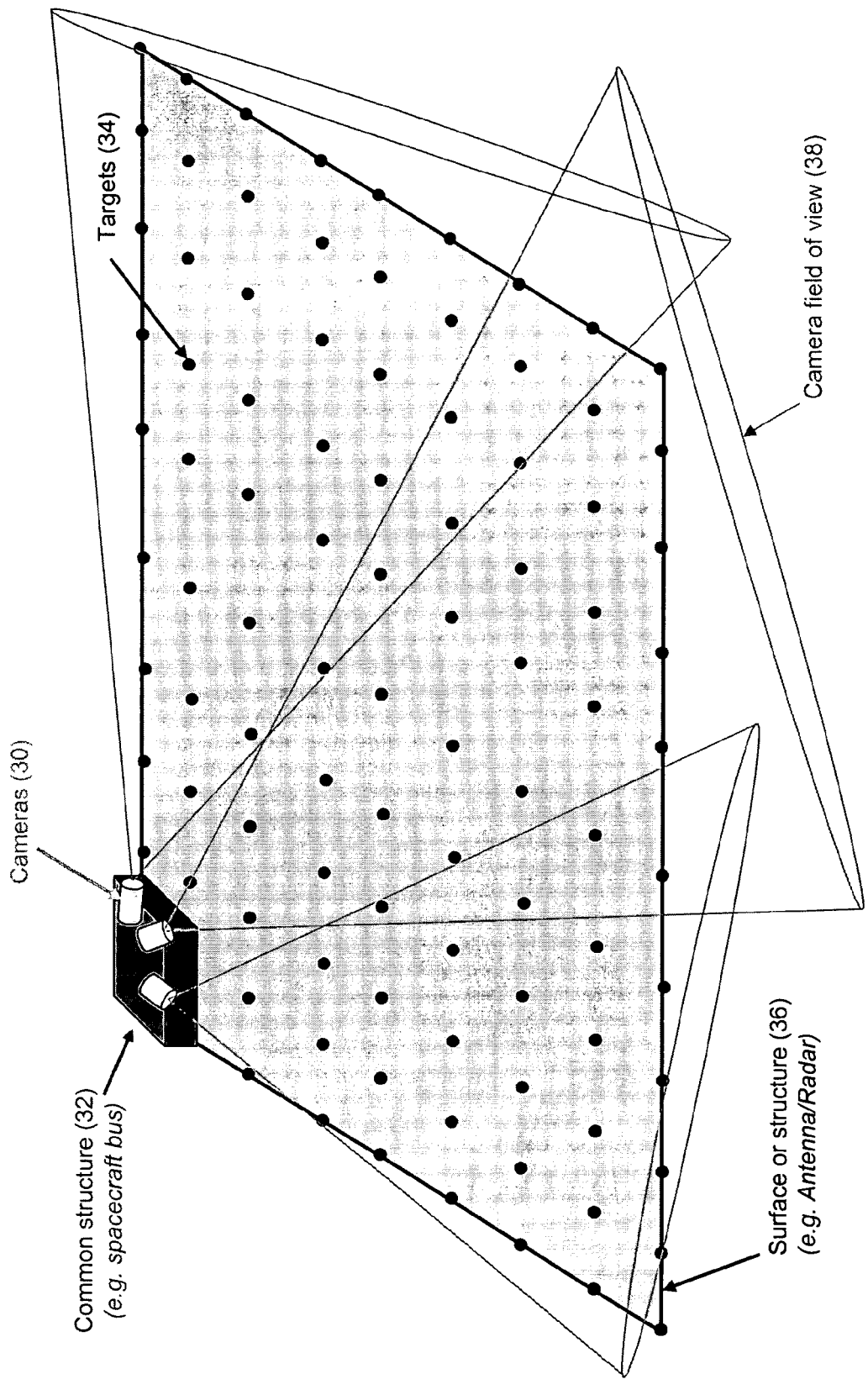
FIG. 3 is a simplified schematic diagram illustrating a further embodiment of the present invention.

FIG. 3 illustrates another alternative embodiment where the cameras 30 are located at the corner of the surface 36 of interest. The cameras 30 are also mounted to a common base 32. Similarly, the cameras 30 are positioned such that the respective field of views 38 of the cameras 30 may overlap.

Figure 4:
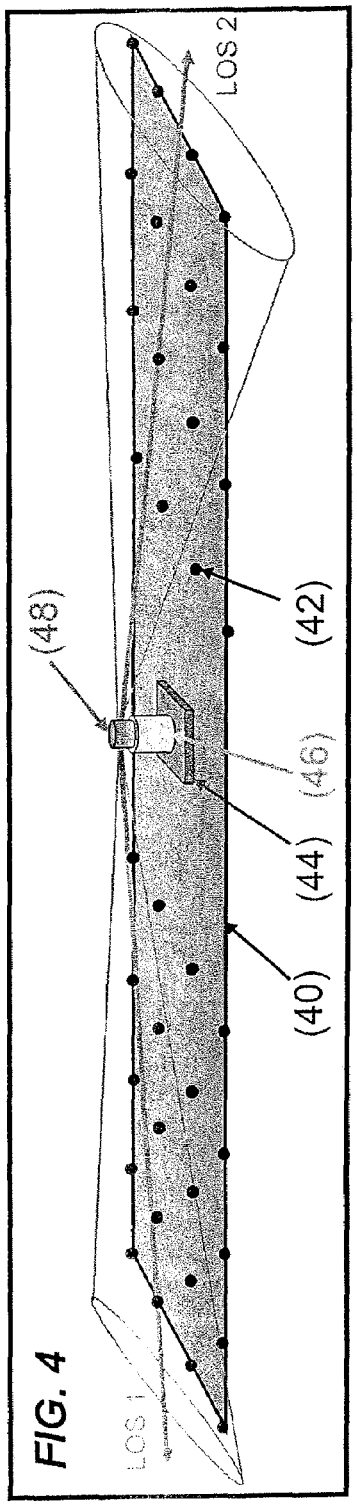
FIG. 4 is a simplified schematic diagram illustrating yet another embodiment of the present invention.

FIG. 4 illustrates an alternative embodiment where front-end optics 48 are used to allow coverage of the entire surface 40 with a single camera 46. In this embodiment, the camera 46 is mounted to a structure 44 and a number of targets 42 are mounted to the surface 40. As will be further described below, the front-end optics 48 is positioned above the camera 46 so as to allow most of or the entire surface 40 to be monitored. The illustration shows the camera 46 oriented with its line-of-sight (LOS) normal to the plane of the surface 40.

Figure 5:
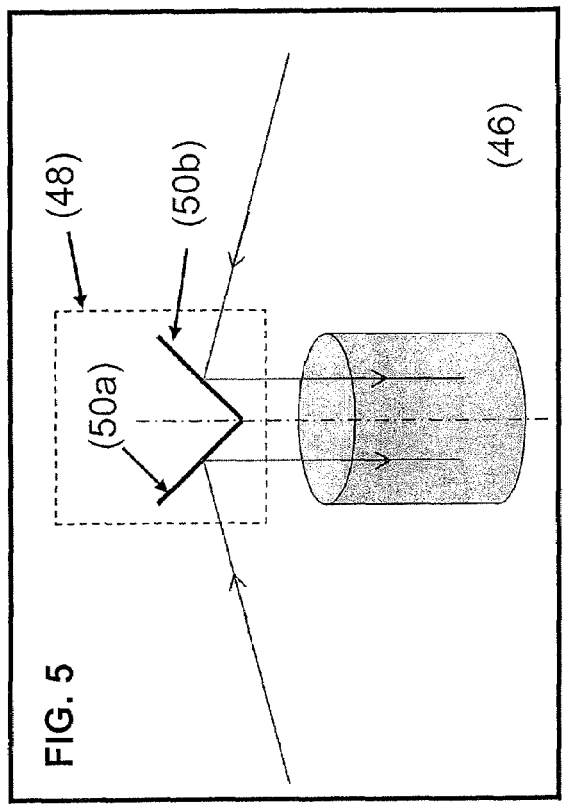
FIG. 5 is a simplified schematic diagram illustrating one embodiment of the front-end optics according to the present invention.

FIG. 5 illustrates one embodiment of the front-end optics 48. The front-end optics 48 may include two mirrors 50a,b arranged in a V-shaped configuration. One mirror 50a is configured to image one half of the surface 40 shown in FIG. 9 and the other mirror 50b is configured to image the other half of the surface 40 shown in FIG. 9. Images from the mirrors 50a,b are captured by the camera 46.

Figure 6:
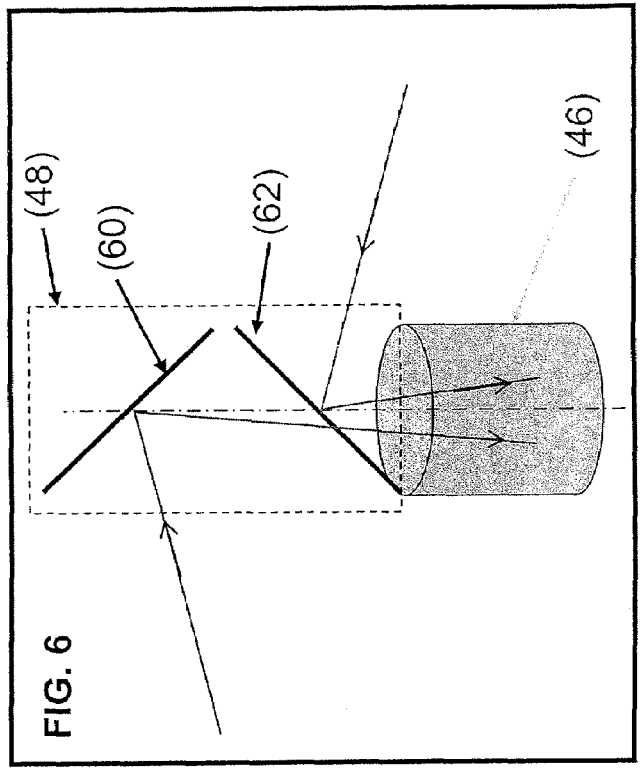
FIG. 6 is a simplified schematic diagram illustrating another embodiment of the front-end optics according to the present invention.

FIG. 6 illustrates another embodiment of the front-end optics 48. The front-end optics 48 may include one mirror 60 and a beam splitter 62. The mirror 60 is configured to image one half of the surface 40 shown in FIG. 9. The image from the mirror 60 is forwarded to the beam splitter 62. The beam splitter 62, in turn, forwards the image to the corresponding area of the camera focal plane. The beam splitter 62 is also configured to image the other half of the surface 40. The image captured by the beam splitter 62 is directed to a different area of the camera focal plane.

As described above, the front-end optics 48 is used to image each half of the surface 40 into different areas of the camera focal plane. This system as shown in FIG. 4 uses a single camera 46 and the front-end optics 48 are fixed with respect to the camera 46. By using the front-end optics 48, the number of cameras is reduced. With one single camera 46, there is no need to ensure that multiple cameras do not move with respect to each other. The front-end optics 48 can also be used in the systems shown in FIGS. 2 and 3 to reduce the number of cameras.

Figure 7B:
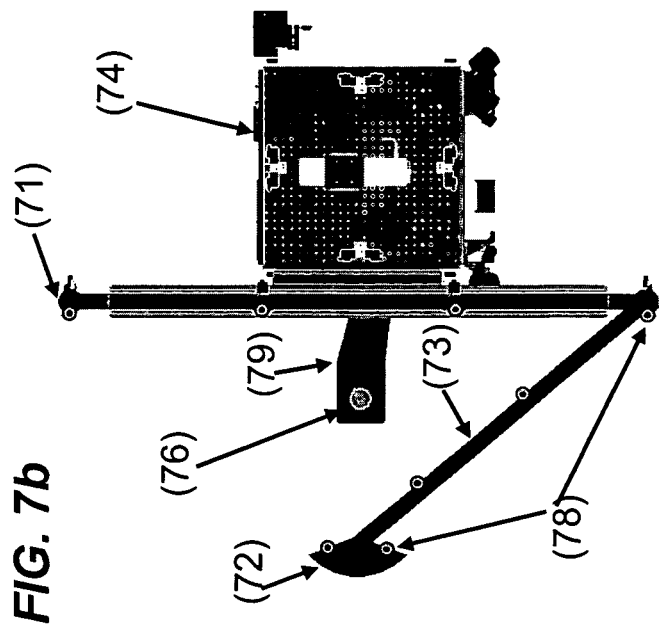
FIGS. 7(a)-(c) are simplified schematic diagrams illustrating another embodiment of the present invention suitable for complex 3-dimensional structures.
Figure 7A:
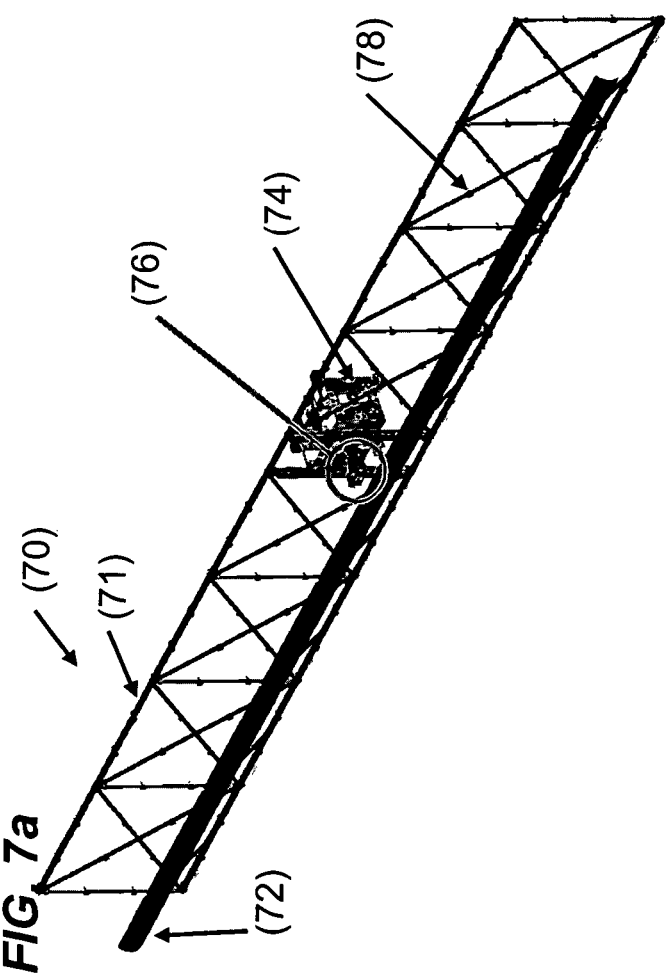
Figure 7C:
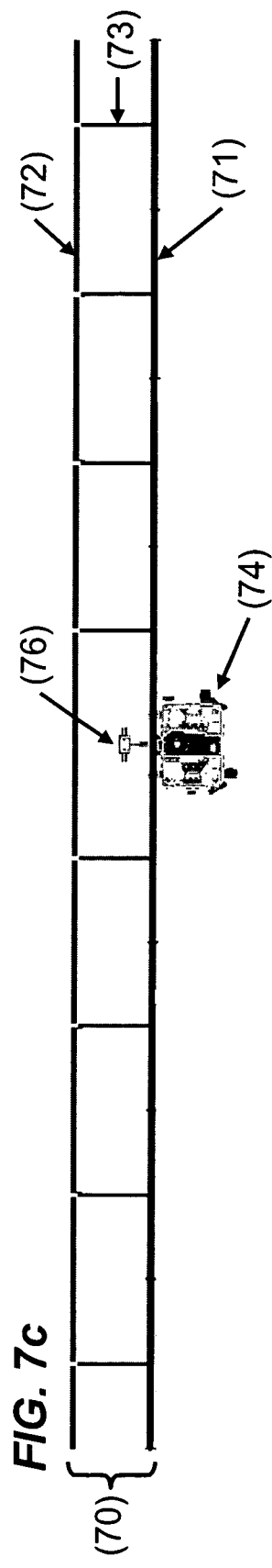

FIGS. 7(a)-(c) illustrate another embodiment of the present invention suitable for complex 3-dimensional structures and systems. FIG. 7(a) shows a perspective view of a large three-dimensional structure 70 that includes two main structural subsystems 71 and 72 connected through structural elements 73. These could represent, for example, a reflector 71 and the receive/transmit module 72 of a radar antenna. The structure 70 is mounted to a base system 74, which in space applications would be a spacecraft bus. Targets 78 are mounted to the two main structural subsystems 71 and 72, as well as to the connecting structural elements 73. The cameras 76 are mounted to the structure 71 through a bracket 79. In this case, two cameras 76 are shown each covering one half of the structure. The cameras 76 are positioned and oriented to provide coverage and track targets mounted on the main structural subsystems 71 and 72 as well as on the connecting structure 73. The cameras 76 take advantage of the geometry of the system and are mounted at a shallow angle with the main structural subsystems 71 and 72. This allows the deflections on all structural elements to be detected and the detected information is used in the shape estimation algorithms to determine the shape of the complex structure.

Several other arrangements are possible, as well as the use of various optical systems, to allow coverage of large areas with a single camera or a reduced number of cameras. These represent different embodiments of the invention and all leverage unique aspects of the SASS system including, for example, the design at a shallow angle and the fact that the shape can be reconstructed mainly from measurement of deflection normal to the surface.

Referring back to FIG. 1, the system 10 provides measurements that are highly sensitive to deflections normal to the plane of the surface 16 and less sensitive to deflections within the plane of the surface 16. Such measurements can then be used to determine the shape of extremely large quasi-planar systems, such as, radar antenna or optical systems. The shape of the surface 16 can be directly reconstructed from these measurements using various reconstruction algorithms, as will be further described below.

The reconstruction algorithms are able to handle target occultation, which may result during large deflections of the surface 16. There is a trade-off between the amount of occultation and the selection of the shallow angle and offset height with which the camera 14 is mounted. Based on the disclosure and teachings provided herein, a person of ordinary skill in the art will appreciate how to handle the trade-off between target occultation and angle selection. The shape reconstruction algorithms will be further described below.

The present invention is technically feasible. This conclusion is based on three key elements: (1) hardware demonstration of camera-based systems capable of reporting target positions with resolution and accuracy better than 0.1-mm, (2) a concept SASS camera/target design for a typical large space-based radar antenna, and (3) the demonstration through simulation of shape reconstruction algorithms and the demonstration of shape reconstruction based solely on the component of deflection normal to the surface to be measured. Each of these elements is discussed in some detail further below.

(1) Demonstration of Basic Sensing Capability

Using commercially available imaging system (e.g., cameras) and targets (e.g., LEDs and LDs), hardware tests have been conducted that demonstrated the basic sensing capability proposed on the SASS system. These tests demonstrated the basic ability of using a camera-based system to report positions of various targets with resolution and accuracy better than 0.1-mm.

(2) SASS Sensor/Target Design

For the purposes of conducting a preliminary feasibility assessment of the SASS system, a system design was developed for a baseline mission including a radar antenna with overall dimensions of 300 by 20 meters (length and width respectively). In one implementation, the following parameters were assumed for the design of the camera/target system: (i) measurement of deflections normal to the plane of the antenna to 0.1-mm accuracy, and (ii) update rate of 16-Hz (assumed adequate for observing the modes of interest). For this analysis, it was assumed that antenna deflections are limited to ±2.6 m. In one implementation, the SASS system would employ two (2) cameras, each imaging one half of the antenna. The SASS system for measuring the position of up to several hundred-strategically placed light sources on each 150 by 20 m antenna panel is further described below.

Figure 8:
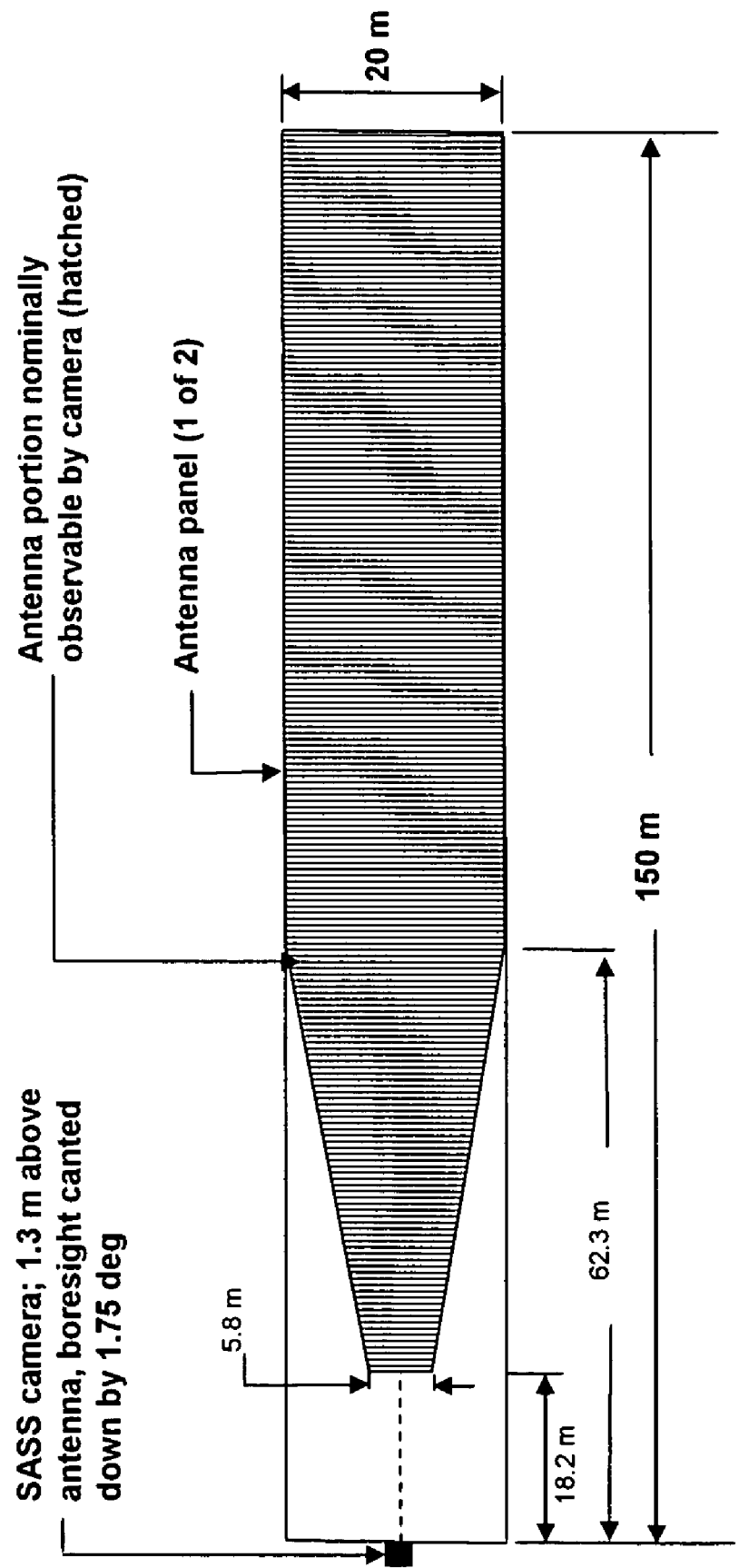
FIG. 8 is a simplified schematic diagram illustrating the field of view of a camera according to one embodiment of the present invention.

The system includes one (1) camera for each of the two (2) halves of the radar antenna plus a computer in addition to an array of light sources. Optionally, a redundant system is added that could be kept in cold standby, or, if desired, could be used to improve accuracy and effectively double the sampling rate of the light sources in the absence of a failure. Each camera is located near the root of its antenna panel, at a height of approximately 1.3 m above its centerline. The camera field of view (FOV) measures 4.69 by 18.24 deg (long axis is parallel to antenna plane) and its boresight is canted down by 1.75 deg. Nominally, this allows the panel to be viewed from 18.2 m outwards. At 18.2 m from the root, a panel width of 5.8 m is observable; while from 62.3 m outwards, the entire width of the panel is within the FOV. The foregoing is further illustrated in FIG. 8. Tip deflections up to ±2.6 m are observable by the camera.

To centroid to a precision sufficient for determining the "vertical" position (deflections normal to the plane of the surface) of the light sources to an accuracy of 0.1 mm (1σ), a frame transfer charged coupled device (CCD) with an image area of 1024 by 2048 pixels is selected, where each pixel measures 10×20 microns. Being defined as perpendicular to the antenna plane, knowledge of the "vertical" position translates into knowledge of the antenna deformation. A 2048 element output register adjacent to the 1024 by 2048 pixel storage area is split into 4 equal parts to permit the use of 4 output amplifiers. This allows the CCD to be read out in less than 56 msec using a 10 MHz readout frequency. The 10 MHz readout frequency is compatible with 10 MHz 12-bit effective digital to analog converters (ADCs), the fastest space qualified ADCs currently available. Of course, if deemed appropriate, additional output amplifiers can be used to increase the update rate beyond 16 Hz. To minimize dark current, the CCD will be operated in the MPP mode, resulting in a full well capability of at least 100,000 electrons.

Vertical clocking of the CCD occurs at 6 MHz, implying that a shift under the mask takes less than 0.2 msec. This implies that the sources can be pulsed with an on time as low as 1 msec, which has three benefits. First, it may be assumed that during the pulse, the velocity of the light source remains constant; secondly, image smearing is negligible, and thirdly, it results in a drastic reduction of average power consumption. The light sources could be organized in banks to enable unambiguous source identification during the acquisition phase (switch on one bank at a time, until all banks are activated).

Adjusting the length of the on pulse allows all light sources to be identical. For example, sources at a distance of 20 m need to be turned on for a period of only $1*(20/150)^2=18$ microsec to provide the same signal level as an identical source at 150 m that is kept on for 1 msec. All light sources are to be turned on during the basic 1.05 msec exposure interval. By staggering the on periods for the sources closer to the camera, it is possible to also reduce the peak power consumption, if desired. After receipt of each 16 Hz synch pulse, the CCD would basically be operated using the following sequence: (a) reset charge in image area (20 nsec); (b) integrate during 1.05 msec (allows proper capture of 1.0 msec light pulse; (c) shift under mask in 0.2 msec; and (d) readout during 56 msec.

Given the FOV and CCD geometry, the optical system has an effective focal length (EFL) of 125 mm. In order to limit the image size of the light sources located at a 150 m distance to approximately 3.0 pixels, the aperture of the optical system is chosen to be 8.3 mm. The resulting slow f/15 lens is easy to design, especially in view of the fact that monochromatic light sources are used. By focusing the fixed focus lens for objects at a distance of 75 m, the blur circle for a source at 150 m is limited to a negligible 0.7 pixel, while for light sources at 20 m, the blur circle measures an acceptable 3.8 pixels.

Without knowing the normal range of sun directions, it is hard to design a camera sunshade. However, the camera can be equipped with a 20 cm long shade that provides a sun exclusion area measuring minimally 11.4 by 25.1 deg (=0.7% of a sphere). In reality, the exclusion area will be larger.

Laser diodes are good candidates for light sources because their narrow spectrum allows the use of a narrow band optical filter in the camera, while their efficiency can be as high as 30%. In addition, their emitting area is typically smaller than 150 micron, which, for all practical purposes, makes them point sources. This allows accurate prediction of the intensity distribution within their images, knowledge of which is a prerequisite for accurate centroiding.

Assuming that a diode emitting at a wavelength of 808 nm is used, and that a filter with a 20 nm wide pass-band centered on 808 nm is employed, it follows that less than 2% of sun light reflected by the antenna onto the camera aperture reaches the CCD. Using a preliminary analysis based on the assumption that a fraction ka of sun light striking the antenna surface is reflected back uniformly over a hemisphere, it is found that the flux at the camera behind the filter is equal to $3.2*k_a$ W/m². Assuming 100% optical transmission, this translates into a stray light flux of $k_a*6.4E-10$ W/pixel.

The laser diodes will be mounted such that their boresights are pointed toward the camera, while they will be clocked such that the long axis of the beam, which typically measures 28 deg full width half maximum (FWHM) is perpendicular to the panel. The short axis of the beam typically has a FWHM of 7 deg. A translation of a source at the tip over 2.6 m would cause light to reach the camera that is less than 1 deg. away from the diode boresight in the long axis plane. Therefore, this translation has no noticeable effect on the signal. Even if the panel were to rotate over 14 deg. at the tip, the signal would reduce by only a factor of two (2). Assuming the use of 1.2 W sources at the tip, and assuming that 50% of the energy is radiated within the FWHM contour, the flux within the FWHM contour is approximated by 1200/2/100=6 mW per square degree. At 150 m, the 8.3 mm aperture of the camera translates into a cone with a half angle of 1.6E-3 deg., implying that the continuous signal of the light source may be approximated by $(1.6E-3)*2*\pi*6.0E-3=4.8E-8$ W. This translates into a signal to background per pixel ratio of $4.8E-8/(K_a*6.4E-10)=75/K_a$, which is adequate for high precision centroiding, even in the absence of sunlight absorption ($K_a=1$).

Without attenuation, the signal generated by the 1.2 W source at a distance of 150 m, flashed for 1 msec, amounts to $4.8E-8*1E-3/(h*c/\lambda)*QE$ electrons. Here, h is the Planck constant (6.63E-34 Js), c is the speed of light (3E8 m/s), $\lambda$ is the wavelength of the source (808E-9 m), and QE is the quantum efficiency of the CCD, assumed at 0.4. Therefore, the signal amounts to 78E6 electrons. Since the signal should be kept below 200,000 electrons, it is necessary to add, e.g., a neutral density filter to the camera that reduces the signal by a factor of approximately 400.

It is expected that the pixel to pixel nonuniformity of the CCD can be limited to 1%, which would avoid the need for calibrating the offset and gain for each pixel. However, if necessary, the offset for the pixels could be obtained by not flashing the sources for one or a few 100 msec intervals while in eclipse. To obtain the gain, a source needs to be integrated into the camera that provides a near-uniform illumination of the focal plane when performing the calibration. These calibrations, if required, are not expected to be frequent.

Measurement of the vertical position of a source at 150 m with an accuracy of 0.1 mm translates into an angular accuracy of 3.82E-5 degrees, which is equivalent to 3.82E-5/4.69*1024=0.00834 pixel. At 20 m, this number increases to 0.0625 pixel.

The major contributors to the centroiding error are: a) noise, b) pixel non-uniformity, and c) error in the predicted line spread function of the light source image. The latter causes the tuning of the precision centroiding algorithm, which is a function of light source distance, to be imperfect. This prevents attainment of the full centroiding accuracy.

For sources at a distance of 150 m, use of demonstrated precision centroiding algorithm results in a noise induced centroiding error equal to $6^{1/2}*r/S$ pixel, where r is the noise per pixel and S is the image signal. For the 10 MHz read out rate the noise can be kept below 100 electrons, while the signal level can be kept above 100,000 electrons. Hence, the noise induced centroiding error will be less than 0.0025 pixel. The error due to pixel nonuniformity may be approximated by $2^{1/2}*pnu*(S/4)/S=0.35*pnu$ pixel, where pnu is the fractional pixel non-uniformity. Thus, a CCD with a 1% pixel non-uniformity results in a centroiding error of 0.0035 pixel. It is expected that, using the demonstrated centroiding algorithm, an accuracy of ½00th of a pixel will be, achieved, which corresponds to 0.005 pixel. When these three contributors are added in an rss fashion, an overall centroiding error of 0.0066 pixel is obtained, which meets the 0.00834 pixel requirement.

Figure 9:
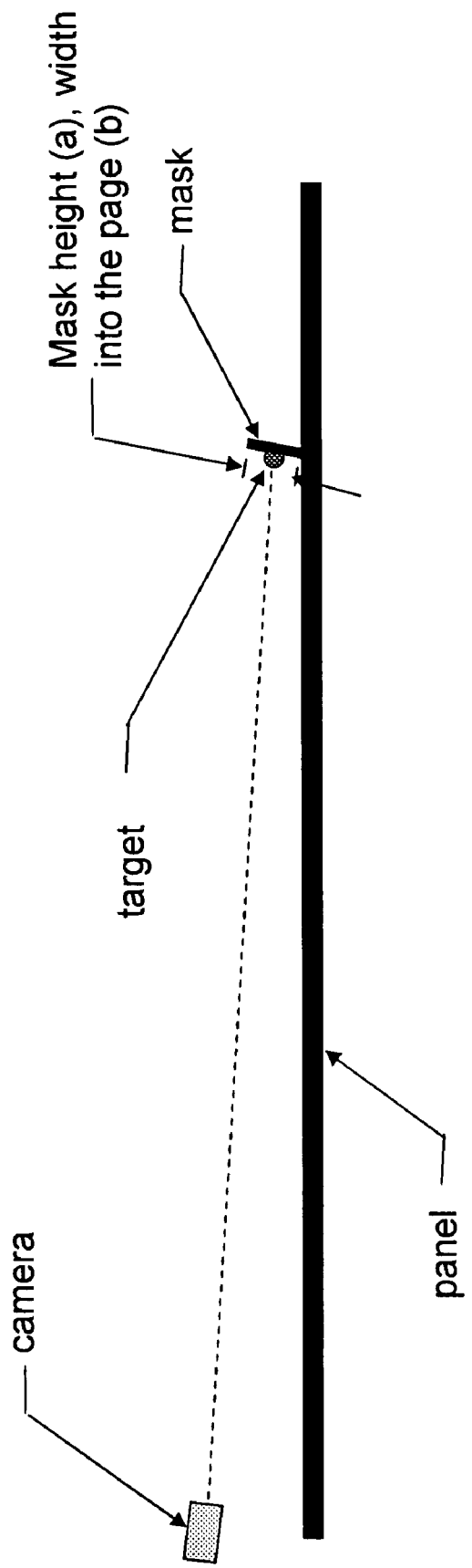
FIG. 9 is a simplified diagram illustrating the use of masks for suppression of stray light that allows increased centroiding accuracy.

Centroiding precision can be maximized by equipping each target with an adequately sized stray light suppression mask, as shown in FIG. 9. The face of the mask is nominally perpendicular to the line from the target to the camera. The side facing the camera is to be treated such that it is nominally matte black at the wavelength of the sources. The surface treatment and size of the mask ensure a flat background in the image area around each target, which allows for increased centroiding accuracy and the use of algorithms that include accurate local background determination. The "vertical" (a) and "horizontal" (b) size of the masks should typically be at least 3 times the size of the image, which for the system described in the previous paragraphs, would result in a mask measuring 110×110 mm for targets located 150 m from the camera, and 24×24 mm for targets located at 20 m from the camera.

(3) Shape Reconstruction Algorithms

Shape reconstruction (estimation) algorithms are a component of the SASS system. Their inputs are the centroids of the various targets measured by the SASS camera sensors and their outputs are estimates of the shape of the quasi-planar structure (e.g., radar-antenna). The various methods that can be used for shape estimation can be classified as static or dynamic and according to their reliance on a physical model of the system. Static methods estimate the shape based on current measurements, dynamic effects are not included and the current shape is assumed to have no dependency on the shape at previous times. Dynamic methods assume a dependency of the current shape on time history, i.e., the shape at previous times. Static and dynamic methods can be based on the fitting of selected base functions, which are arbitrarily selected without the benefit of a physical model of the system or on the estimation of parameters obtained from a physical model of the system.

Important advantages of non-physics based methods are their potential application to a broad set of systems and insensitivity to modeling errors. Disadvantages are the requirement for more measurements to achieve a given accuracy and larger computational requirements when compared to algorithms that are based on a physical model of the system. Shape retrieval algorithms are ultimately evaluated against requirements, such as: (1) accuracy, (2) time required for execution, (3) computational requirements, (4) robustness to model errors, and (5) robustness to temporary or permanent loss of targets (due respectively to target occultation or failure).

These requirements drive the design of the algorithms in different and some times conflicting manners. For example, short execution time and low computational requirements favor algorithms that take advantage of a physical model of the system, while robustness to model errors favors algorithms that do not rely on a physical model of the system. This indicates that it may be required or desirable to have multiple shape estimation algorithms running simultaneously, each performing well within its design space.

Another important aspect in the design of the shape reconstruction algorithms is a good understanding of the system and its operating environment. Even algorithms that are not based on a physical model of the system can benefit from proper understanding of the system. For example, while the shape of an isotropic planar antenna made of a single segment can be properly represent using harmonic functions as base functions, a space-based radar antenna of several hundred meters is likely to be built in segments, in which case, it may be more appropriate to use the base functions piecewise on each segment, or to use a different set of base functions, that perhaps allow slope discontinuity between segments. Furthermore, deformations caused by mechanical disturbances such as reaction wheel disturbances and radiation pressure can probably be well represented in terms of mode shapes. On the other hand, thermal induced deformations can be obtained from a physical model of the system and temperature measurements at discrete points on the structure.

As an example, a shape estimation algorithm for the same baseline system described in the foregoing paragraphs, i.e., a radar antenna 300 m long and 20 m wide, is described below. The system is assumed isotropic, and its mass and stiffness are selected to yield a first structural mode with frequency of about 0.1 Hz. A finite element model of the system was generated with six degrees-of-freedom per node, i.e., three translations and three rotations and free-free boundary conditions. This model was used to demonstrate shape retrieval using only the component of deformation normal to the plane of the antenna and to illustrate the process proposed for algorithm performance evaluation.

Figure 10:
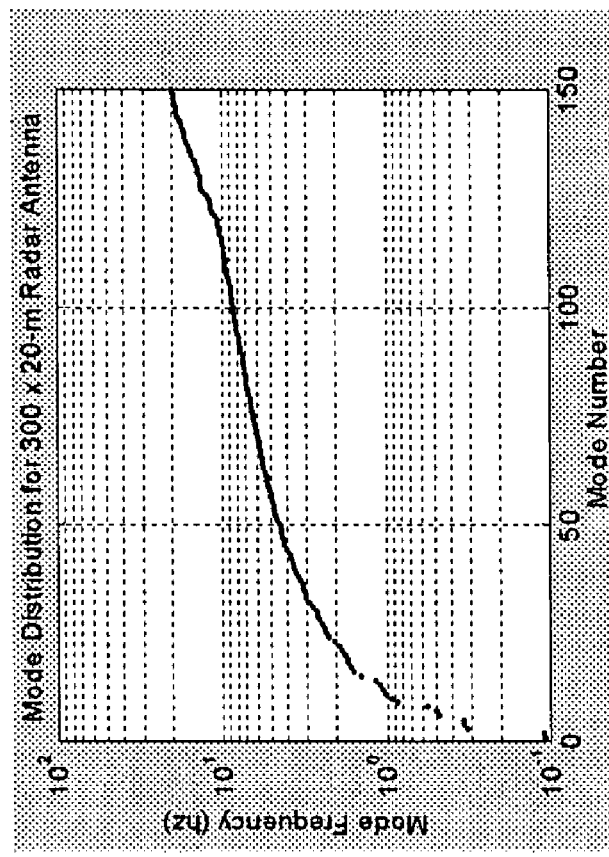
FIG. 10 is a simplified schematic diagram illustrating the configuration and frequencies of structural modes of a radar-antenna for use in an embodiment of the present invention.
Figure 10:
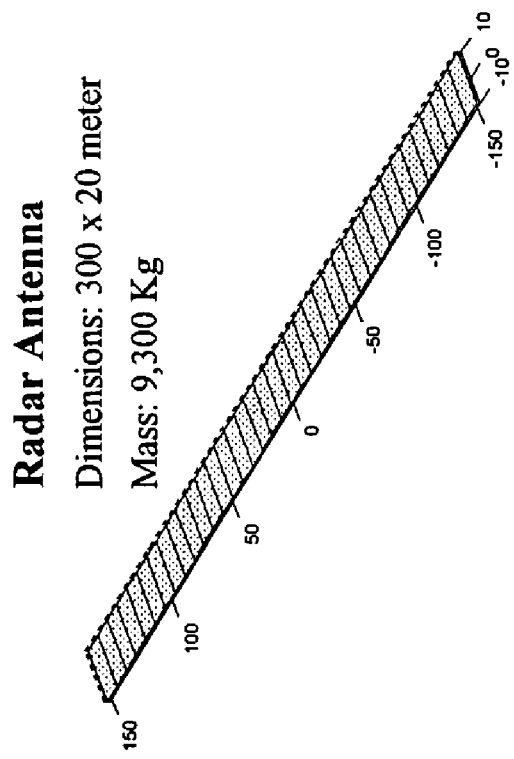
Figure 11:
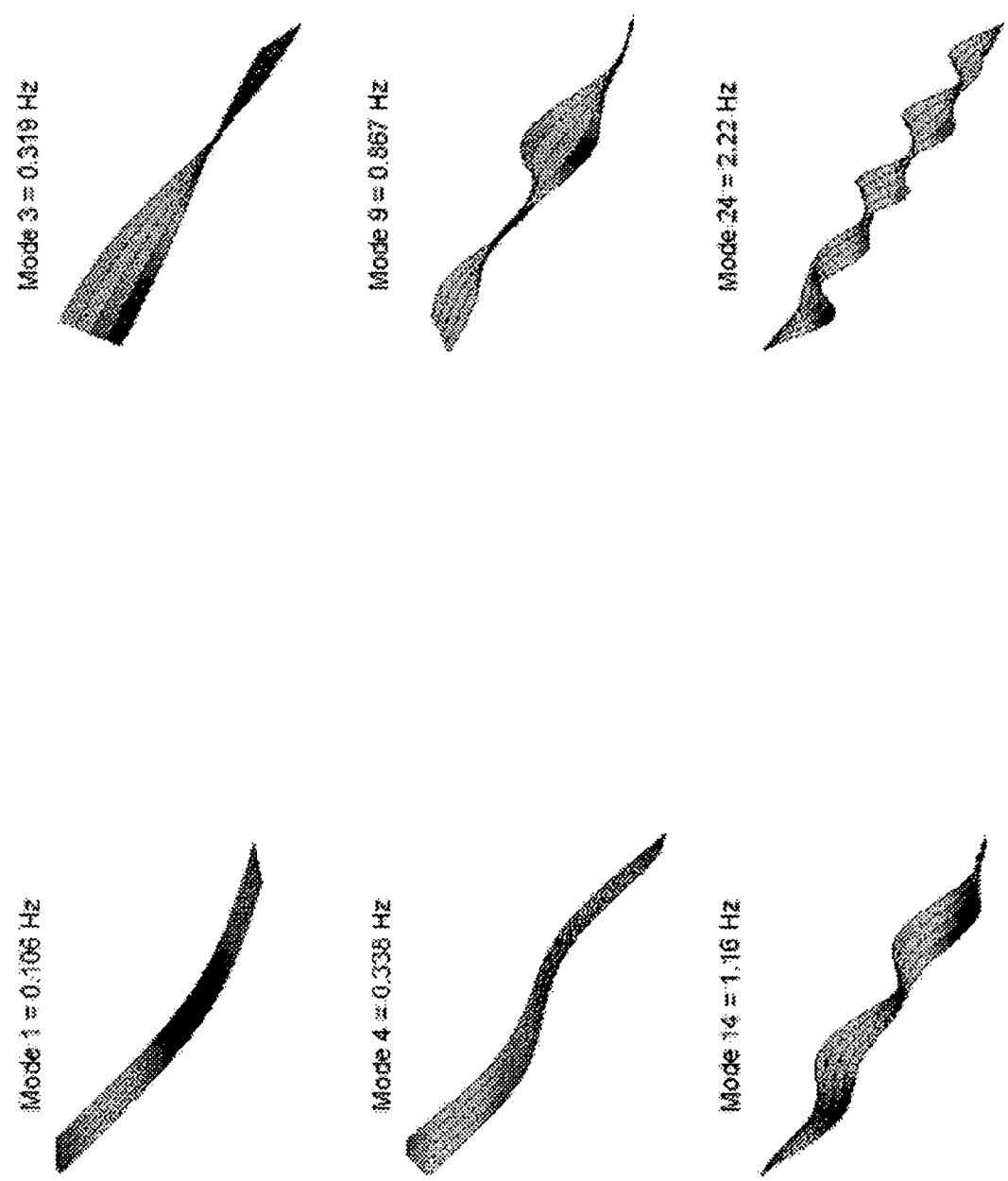
FIG. 11 is a simplified schematic diagram illustrating selected mode shapes for the radar-antenna as shown in FIG. 10.

FIG. 10 shows the system in its nominal nondeformed condition and also shows a plot of the mode frequencies versus mode number. The high modal density of such a system is clearly illustrated with 150 modes up to 20 Hz. A few selected modes shapes and their corresponding frequencies are shown in FIG. 11.

For this feasibility assessment, three algorithms were considered: (1) a static, nonphysics-based algorithm using thin-plate splines method, (2) a static, physics-based algorithm using linear least-squares estimation of the modal coordinate vector, and (3) a dynamic, physics-based algorithm using a Kalman-Bucy filter to estimate the modal coordinate vector and its time derivative. All three algorithms allow estimation of the antenna shape using measurements of the deflections normal to the plane of the antenna. In particular, the least-squares method and the Kalman-Bucy filter allowed reconstruction of the complete mode shapes, with six degrees-of-freedom at each node, using only measurements of the deflection normal the plane of the antenna. The thin-plate splines method is more computationally intensive than the least-squares method and it also requires more targets than the other two methods. In fact, because it does not rely on a physical model retrieval of a mode shape including p waves along the length of the array requires at least 2p targets along the direction of interest. This is the spatial analog of the temporal Shannon sampling theorem for reconstruction of harmonic signals from sampled data.

Several other algorithms can be used to process the SASS sensor data and generate estimates of shape. Algorithm selection depends on the specific application. Nonetheless, the analysis conducted and the results presented demonstrate the ability of estimating the shape of quasi-planar structures from measurements of the deflection normal to the plane of the surface and demonstrated the feasibility of the SASS system for shape estimation of large quasi-planar structures.

The least-squares algorithm has the least computational requirements of all three methods, it does rely on a physical model of the system, in this case, knowledge of the mode shapes which represent the structural dynamics behavior of the system. It is demonstrated through analysis that retrieval of p modes requires at a minimum p targets properly placed on the array.

Of the three methods, the Kalman-Bucy filter requires the least amount of targets to retrieve the shape of the antenna. It is also the only method that provides an optimum estimate of time-rate-of-change of the surface shape, important for handling target occultation. On the other hand, it relies most heavily on knowledge of a physical model of the system. In addition to knowledge of the model shapes, it requires knowledge of dynamic parameters, such as structural damping, and knowledge of the inputs exciting the system, such as forces from thrusters firings and reaction wheels. As with the least-squares method, on-orbit system identification is recommended for reliable estimate of the mode shapes in the relevant environment.

Figure 12:
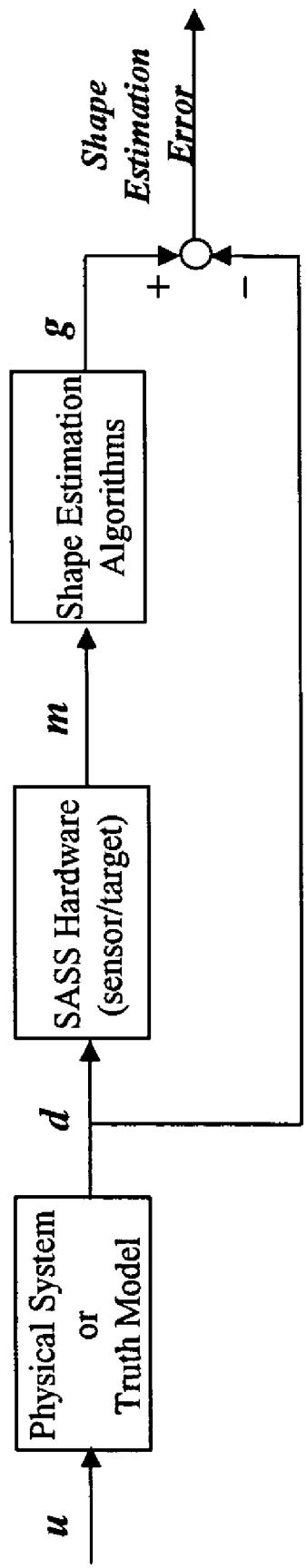
FIG. 12 is a simplified schematic diagram illustrating one approach for algorithm performance evaluation according to one embodiment of the present invention.

FIG. 12 illustrates one approach for algorithm performance evaluation. In FIG. 12, u represents the excitations acting on the system, i.e., mechanical disturbances due to on-board equipment and secular effects, such as reaction wheels, thruster firings, moving mechanisms, fuel slosh, gravity gradient, and radiation pressure; and thermal disturbances due to solar radiation and heating from onboard equipment. d represents the actual displacements at any point in the radar-antenna caused by the various excitations acting on the system. The SASS system generates measurements m from the actual displacements d; in fact, m is likely to be a subset of d, representing displacements at discrete target locations. m also differs from d in that it contains the effects of the sensor dynamics, such as, measurement latency and lag caused by the sensor limited bandwidth, sensor noise and quantization effects and errors due to sensor bias and drift. g is the estimated shape of the radar-antenna obtained processing measurements m through the shape estimation algorithms. The shape estimation error is defined as the difference between the estimated and true shape, i.e., g-d. For the analysis, d was computed using a truth model of the system (dynamics and thermal models) and a model of the SASS system. On an actual system, actual hardware would replace the system and SASS models.

Figure 13A:
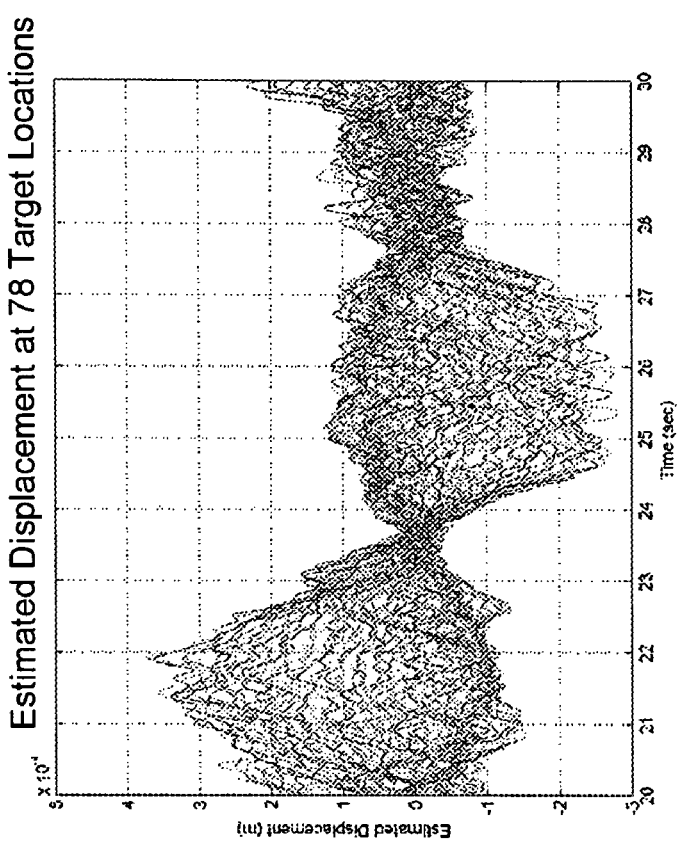
FIGS. 13(a) and (b) are graphs showing actual and estimated displacements according to one embodiment of the present invention.
Figure 13B:
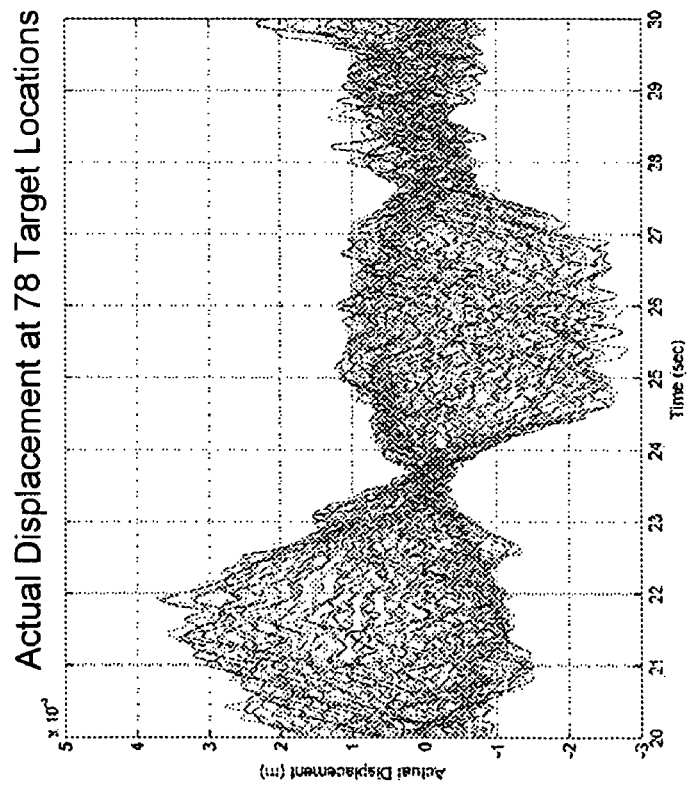
Figure 14:
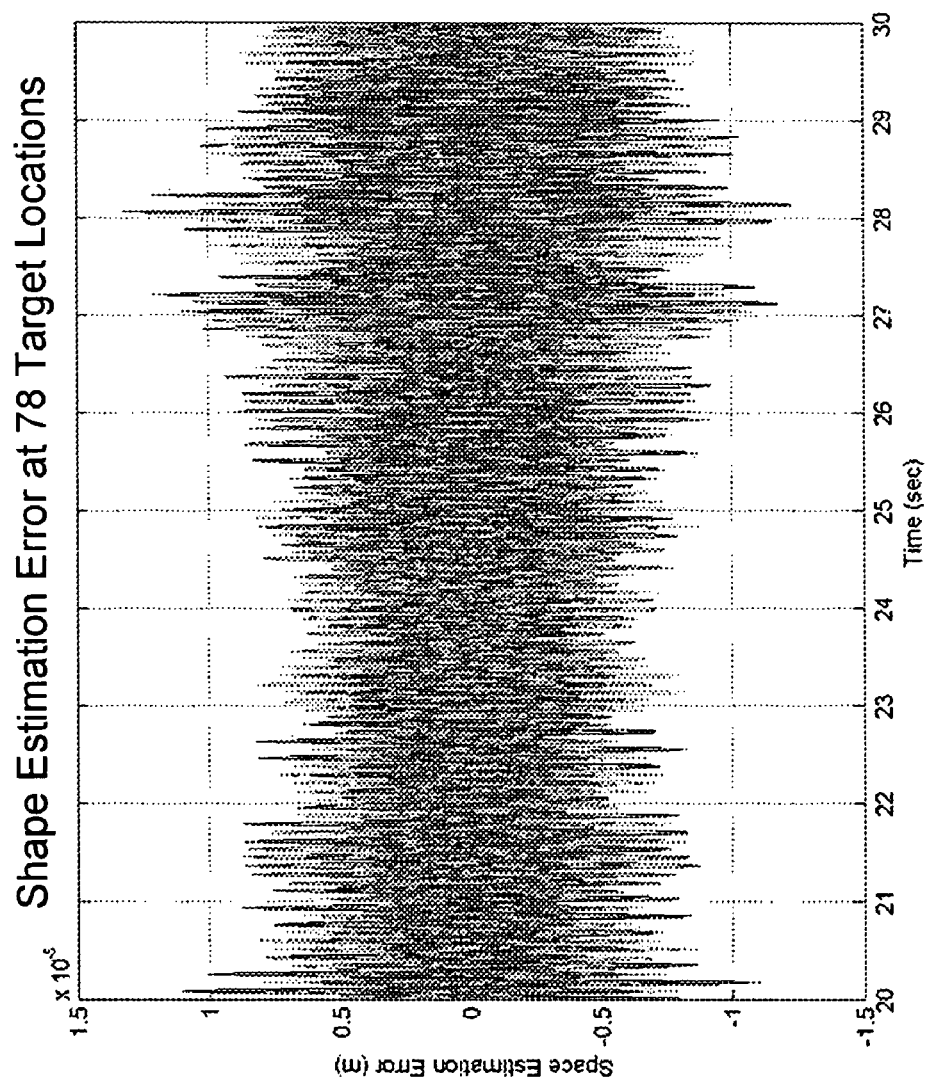
FIG. 14 is a graph showing shape estimation errors according to one embodiment of the present invention.

The process described in FIG. 12 was used to evaluate the least-squares algorithm using the dynamics model of the 300 m by 20 m radar antenna described above. For this analysis, the dynamics model of the system containing 150 structural modes up to 20 Hz was used as the truth model and the SASS sensor/target was assumed to be ideal, i.e., no dynamics and sensor errors were introduced. This allowed estimation errors due to the algorithm to be isolated. The number of targets used was 78 and the estimation algorithm was set up to estimate the first 50 modes of the system (which corresponds to estimating modes up to about 4 Hz). FIG. 13(a) shows the actual displacements normal to the plane of the antenna at the 78 target locations as a function of time, and the estimated displacements are shown in FIG. 13(b). The results correspond to the case of a random force input (band-limited white noise) acting near the center of the antenna with rms value of 1N. The shape estimation errors are shown in FIG. 14 as a function of time for all 78 target locations. It is seen that for the selected input the actual displacements are within 0.3 mm and the maximum shape estimation errors within 0.015 mm. These results demonstrated shape estimation using the selected algorithms and illustrate the process for algorithm performance evaluation.

Based on the disclosure and teachings provided herein, it should be understood that the present invention can be used in a variety of applications including, for example, commercial and/or government spacecraft programs, as well as ground and airborne applications. A person of ordinary skill in the art will appreciate other ways and/or methods to deploy the present invention in different types of applications.

It should be understood that the present invention as described above can be implemented in software, hardware, or a combination of both, in the form of control logic in a modular or integrated manner. In the case of software implementation, the control logic may be embodied in a computer-readable medium that is executable by a computer, a processor or other processing devices. Based on the disclosure and teachings provided herein, a person of ordinary skill in the art will appreciate other ways and/or methods to implement the present invention.

The above description is illustrative but not restrictive. Many variations of the present invention will become apparent to those skilled in the art upon review of the disclosure. The scope of the present invention should, therefore, be determined not with reference to the above description, but instead should be determined with reference to the pending claims along with their full scope or equivalents.

What is claimed is:

1. A system for providing shape determination of a surface, the system comprising:
    a plurality of targets located on the surface;
    a plurality of sensor devices configured to obtain information relating to positions of the plurality of targets, wherein the line-of-sight of each sensor device is at a shallow angle relative to the plane of the surface, and wherein each sensor device is mounted to the surface; and
    processing logic configured to:
        derive deflection information based on the obtained information relating to positions of the plurality of targets, wherein the deflection information includes information relating to deflections of the plurality of targets normal to the plane of the surface; and
        execute a shape reconstruction algorithm based on the deflection information to determine the shape of the surface.

2. The system of claim 1 wherein the plurality of targets include one or more passive elements; and
    wherein the one or more passive elements include a pattern.

3. The system of claim 2 wherein the plurality of targets are surrounded by corresponding stray light suppression masks.

4. The system of claim 1 wherein the plurality of targets include one or more active elements; and
    wherein the one or more active elements include one or more light-emitting diodes or laser diodes.

5. The system of claim 4 wherein light sources associated with the one or more light-emitting diodes or laser diodes are remotely located and optical fibers are used to transmit light from the light sources to the plurality of targets.

6. The system of claim 4 wherein the plurality of targets are surrounded by corresponding stray light suppression masks.

7. The system of claim 1 wherein the plurality of sensor devices include one or more cameras.

8. The system of claim 1 wherein the plurality of sensor devices are mounted close to each other so as to allow their relative motion to be neglected.

9. The system of claim 1 wherein the plurality of sensor devices are mounted on a spacecraft bus; and
    wherein the surface is part of a radar antenna.

10. The system of claim 1 wherein the shape reconstruction algorithm is selected from a plurality of selectable shape reconstruction algorithms.

11. The system of claim 10 wherein the plurality of selectable shape reconstruction algorithms include a static, non-physics-based algorithm using thin-plate splines method.

12. The system of claim 10 wherein the plurality of selectable shape reconstruction algorithms include a static, physics-based algorithm using linear least-squares estimation of modal coordinate vector.

13. The system of claim 10 wherein the plurality of selectable shape reconstruction algorithms include a dynamic, physics-based algorithm using a Kalman-Bucy filter to estimate modal coordinate vector and its time derivative.

14. The system of claim 1 wherein the surface is planar or quasi-planar.

15. The system of claim 1 wherein the plurality of sensor devices include a camera having a focal plane, the system further comprising:
    front-end optics configured to image a first section of the surface to a first area of the focal plane and a second section of the surface to a second area of the focal plane.

16. The system of claim 1, wherein the processing logic configured to execute a shape reconstruction algorithm performs shape estimation with six degrees-of-freedom through reconstruction of partial observations.

17. The system of claim 1, wherein each sensor device is mounted to the surface via a common mounting structure.

18. A shape determination system for determining the shape of a planar or quasi-planar surface associated with a structure, the system comprising:
    a plurality of targets located on the surface;
    a plurality of sensor devices configured to capture information relating to positions of the plurality of targets, wherein the angle between the line-of-sight of each sensor device and the plane of the surface is shallow, and wherein each sensor device is mounted to the surface; and
    processing logic configured to:
        derive deflection information based on the captured information relating to positions of the plurality of targets, wherein the deflection information includes information relating to deflections of the plurality of targets normal to the plane of the surface;
        select a shape reconstruction algorithms from a plurality of selectable shape reconstruction algorithms; and
        execute the selected shape reconstruction algorithm to determine the shape of the surface.

19. The shape determination system of claim 18 wherein the plurality of targets include one or more passive elements; and
    wherein the one or more passive elements include a pattern.

20. The shape determination system of claim 18 wherein the plurality of targets include one or more active elements; and
    wherein the one or more active elements include one or more light-emitting diodes or laser diodes.

21. The shape determination system of claim 18 wherein the plurality of sensor devices include one or more cameras.

22. The shape determination system of claim 18 wherein the plurality of sensor devices are mounted close to each other so as to allow their relative motion to be neglected.

23. The shape determination system of claim 18 wherein the plurality of sensor devices are mounted on a spacecraft bus; and
    wherein the structure is a radar antenna.

24. The shape determination system of claim 18 wherein the plurality of selectable shape reconstruction algorithms include a static, non-physics-based algorithm using thin-plate splines method.

25. The shape determination system of claim 18 wherein the plurality of selectable shape reconstruction algorithms include a static, physics-based algorithm using linear least-squares estimation of modal coordinate vector.

26. The shape determination system of claim 18 wherein the plurality of selectable shape reconstruction algorithms include a dynamic, physics-based algorithm using a Kalman-Bucy filter to estimate modal coordinate vector and its time derivative.

27. The shape determination system of claim 18 wherein the plurality of sensor devices include a camera having a focal plane, the system further comprising:
front-end optics configured to image a first section of the surface to a first area of the focal plane and a second section of the surface to a second area of the focal plane.

28. The system of claim 18, wherein each sensor device is mounted to the surface via a common mounting structure.

29. A method for determining the shape of a surface, the surface having a plurality of targets located thereon, comprising:
using a plurality of sensor devices to capture information related to positions of the plurality of targets, wherein the line-of-sight of each sensor device is at a shallow angle relative to the plane of the surface, and wherein each sensor device is mounted to the surface; and
using a processor to derive deflection information based on the captured information relating to positions of the plurality of targets, the deflection information including information relating to deflections of the plurality of targets normal to the plane of the surface, and execute a shape reconstruction algorithm based on the deflection information to determine the shape of the surface.

30. The method of claim 29 wherein the plurality of targets include one or more passive elements; and
wherein the one or more passive elements include a pattern.

31. The method of claim 29 wherein the plurality of targets include one or more active elements, and
wherein the one or more active elements include one or more light-emitting diodes or laser diodes.

32. The method of claim 29 wherein the plurality of sensor devices include one or more cameras.

33. The method of claim 29 wherein the plurality of sensor devices are mounted close to each other so as to allow their relative motion to neglected.

34. The method of claim 29 wherein the plurality of sensor devices are mounted on a spacecraft bus; and
wherein the surface is part of a radar antenna.

35. The method of claim 29 further comprising:
selecting the shape reconstruction algorithm from a plurality of selectable shape reconstruction algorithms.

36. The method of claim 35 wherein the plurality of selectable shape reconstruction algorithms include a static, non-physics-based algorithm using thin-plate splines method.

37. The method of claim 35 wherein the plurality of selectable shape reconstruction algorithms include a static, physics-based algorithm using linear least-squares estimation of modal coordinate vector.

38. The method of claim 35 wherein the plurality of selectable shape reconstruction algorithms include a dynamic, physics-based algorithm using a Kalman-Bucy filter to estimate modal coordinate vector and its time derivative.

39. The method of claim 29 wherein the surface is planar or quasi-planar.

40. The method of claim 29 wherein the plurality of sensor devices include a camera having a focal plane, the method further comprising:
configuring front-end optics to image a first section of the surface to a first area of the focal plane and a second section of the surface to a second area of the focal plane.

41. The method of claim 29, wherein using a processor to execute a shape reconstruction algorithm includes performing shape estimation with six degrees-of-freedom through reconstruction of partial observations.

42. The system of claim 29, wherein each sensor device is mounted to the surface via a common mounting structure.

43. A method for determining the shape of a planar or quasi-planar surface associated with a structure, the surface having a plurality of targets located thereon, comprising:
using a plurality of sensor devices to capture information related to positions of the plurality of targets, wherein the angle between the line-of-sight of each sensor device and the plane of the surface is shallow, and wherein each sensor device is mounted to the surface; and
using a processor to derive deflection information based on the captured information relating to positions of the plurality of targets, the deflection information including information relating to deflections of the plurality of targets normal to the plane of the surface, select a shape reconstruction algorithm from a plurality of selectable shape reconstruction algorithms and execute the selected shape reconstruction algorithm based on the deflection information to determine the shape of the surface.

44. The method of claim 43 wherein the plurality of targets include one or more passive elements; and
wherein the one or more passive elements include a pattern.

45. The method of claim 43 wherein the plurality of targets include one or more active elements, and
wherein the one or more active elements include one or more light-emitting diodes or laser diodes.

46. The method of claim 43 wherein the plurality of sensor devices include one or more cameras.

47. The method of claim 43 wherein the plurality of sensor devices are mounted close to each other so as to allow their relative motion to neglected.

48. The method of claim 43 wherein the plurality of sensor devices are mounted on a spacecraft bus; and
wherein the structure is a radar antenna.

49. The method of claim 43 wherein the plurality of selectable shape reconstruction algorithms include a static, non-physics-based algorithm using thin-plate splines method.

50. The method of claim 43 wherein the plurality of selectable shape reconstruction algorithms include a static, physics-based algorithm using linear least-squares estimation of modal coordinate vector.

51. The method of claim 43 wherein the plurality of selectable shape reconstruction algorithms include a dynamic, physics-based algorithm using a Kalman-Bucy filter to estimate modal coordinate vector and its time derivative.

52. The method of claim 43 wherein the plurality of sensor devices include a camera having a focal plane, the method further comprising:
configuring front-end optics to image a first section of the surface to a first area of the focal plane and a second section of the surface to a second area of the focal plane.

53. The method of claim 43, wherein each sensor device is mounted to the surface via a common mounting structure.

* * * * *